(No Model.)
T. A. EDISON.
CARBONIZING CHAMBER.
No. 439,393.  Patented Oct. 28, 1890.
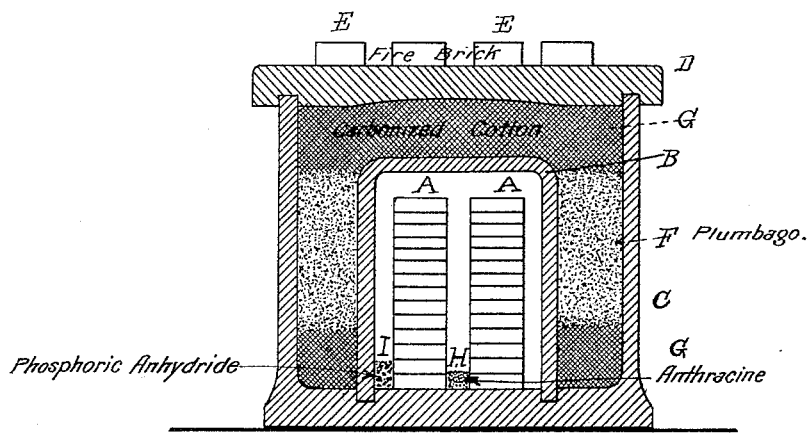
WITNESSES:
INVENTOR:
Thomas A. Edison
By Rich'd N. Dyer
Atty.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

CARBONIZING-CHAMBER.

SPECIFICATION forming part of Letters Patent No. 439,393, dated October 28, 1890.

Application filed September 13, 1882. Serial No. 71,760. (No model.)

*To all whom it may concern:*

Be it known that I, THOMAS A. EDISON, of Menlo Park, in the county of Middlesex and State of New Jersey, have invented a new and useful Improvement in Carbonizing-Chambers, (Case No. 477,) of which the following is a specification.

In the preparation of the carbon incandescing conductors used in electric lamps it is necessary to carbonize the material used in a close chamber, from which oxygen is excluded as completely as possible, and under pressure or strain.

My invention relates to carbonizing-chambers used for this purpose; and it consists in a vessel having a hollow space for containing the forms which hold the fibers to be carbonized, such space inclosed by walls of plumbago, and this in turn inclosed in outer walls of the same substance, the space between the inner and outer walls being filled partly with powdered plumbago tamped or driven firmly in and partly with a material which combines with oxygen. I may also place within the space which holds the forms a small quantity of plumbago saturated with anthracine or other hydrocarbon compound which decomposes at a red or even a lower heat. This compound decomposes and produces an atmosphere of hydrogen in the chamber. A small quantity of phosphoric anhydride may also be used to absorb the aqueous vapor, which it will retain at the highest temperatures.

The drawing is a sectional view of a carbonizing-chamber constructed according to my invention.

A A represent the forms which contain the fibers to be carbonized piled one above another. Such forms are preferably made of carbon in order to withstand the high heat to which they are subjected, and the carbons are held within them under strain or pressure. The forms are inclosed by the cover B, made of plumbago, which is set in a groove in the bottom of the outer covering C, also of plumbago. The plumbago lid D fits tightly upon the top of cover C, and fire-brick E E are set on the lid, serving as weights to hold it down. The space between the inner and outer covers B and C is filled partly with powdered plumbago F, driven tightly in, and partly with carbonized cotton G or other material capable of absorbing or combining with oxygen and withstanding heat.

H is the plumbago saturated with anthracine, and I is the phosphoric anhydride. The whole is set into a suitable furnace and subjected to a high temperature. After carbonization, the fibers can be removed by taking off the lid D, removing a portion of the cotton G, and lifting up the interior cover B. By this construction such oxygen as might penetrate within the outer cover is absorbed by the carbonized cotton G.

The plumbago used for the covers is the ordinary mixture of that substance with clay used for making crucibles.

I am aware that hydrocarbon gas or vapor has been passed through a carbonizing-chamber during the process of carbonization for the purpose of producing a deposit of carbon upon the filaments.

What I claim is—

1. In a carbonizing-chamber, the combination, with inner and outer inclosing-covers, of a material placed between such covers capable of absorbing or combining with oxygen, substantially as set forth.

2. In a carbonizing-chamber, the combination, with the inner and outer inclosing-covers, of carbonized cotton or similar substances sensitive to oxidation placed between such covers, substantially as set forth.

3. In a carbonizing-chamber, the combination, with the inner and outer inclosing-covers, of carbonized cotton and tightly-packed plumbago placed between said covers, substantially as set forth.

4. The method of preparing filaments for incandescent lamps which consists in placing uncarbonized filaments in a carbonizing-chamber and placing a carbon or hydrocarbon compound within said chamber, and finally applying a carbonizing-heat, whereby a hydrogen atmosphere is produced in the chamber during the carbonization, substantially as set forth.

This specification signed and witnessed this 25th day of August, 1882.

THOS. A. EDISON.

Witnesses:
H. W. SEELY,
EDWARD H. PYATT.